United States Patent [19]
Daniels et al.

[11] 3,846,687
[45] Nov. 5, 1974

[54] DIGITAL POWER CONTROL CIRCUIT FOR AN ELECTRIC WRIST WATCH

[75] Inventors: R. Gary Daniels, Tempe; James Walter Foltz, Scottsdale, both of Ariz.

[73] Assignee: Motorola, Inc., Franklin Park, Ill.

[22] Filed: July 10, 1972

[21] Appl. No.: 270,130

Related U.S. Application Data

[63] Continuation of Ser. No. 169,246, Aug. 5, 1971.

[52] U.S. Cl.................. 318/446, 318/447, 318/444, 307/132 EA
[51] Int. Cl. ............................................. H02p 1/18
[58] Field of Search....... 307/142, 140 EA, 132 EA, 307/132 E, 121; 318/446, 447, 159, 160, 456, 457, 451, 450, 444

[56] References Cited
UNITED STATES PATENTS

| | | | |
|---|---|---|---|
| 3,325,657 | 6/1967 | Corey | 318/444 X |
| 3,534,225 | 10/1970 | Poupin | 307/121 X |
| 3,626,207 | 12/1971 | Bartlett | 307/140 X |
| 3,668,496 | 6/1972 | Makowitz et al. | 318/466 |
| 3,676,759 | 7/1972 | Mayr et al. | 318/466 |

*Primary Examiner*—B. Dobeck
*Attorney, Agent, or Firm*—Vincent J. Rauner; Maurice J. Jones, Jr.

[57] ABSTRACT

The control circuit selectively connects and disconnects power flowing to a signal source which drives a load. Included in the control circuit is a counter having a toggle terminal connected to the signal source output, a reset terminal connected to the load output, and an output terminal connected to the control terminal of a switch. The input and output terminals of the switch are connected in the power line for the signal source. If the duration between first control signals developed by the load exceeds a predetermined time, the driving signal from the signal source causes the counter to generate a second control signal which turns off the switch. A subsequent firt control signal resets the counter which turns the switch back on.

14 Claims, 2 Drawing Figures

PATENTED NOV 5 1974　　　　　　　　　　　3,846,687

DIGITAL POWER CONTROL CIRCUIT FOR AN ELECTRIC WRIST WATCH

This is a continuation, of application Ser. No. 169,246 filed Aug. 5, 1971.

BACKGROUND OF THE INVENTION

Control circuits providing control signals when the time duration between monitored signals exceeds a predetermined amount are useful in many electronic applications. For example, an electric or electronic wrist watch may contain a small motor for movement of the hands of the watch. This motor, which is driven by energy derived from a battery, can be temporarily stopped by acceleration which might be unintentionally applied by a rapid wrist movement. The motor also can be intentionally stopped by a mechanical locking device operated by the stem of the watch. If the motor is locked in place by the stem, so that the watch can be shipped or stored, it is desirable that the battery be automatically disconnected from the motor by an electric circuit within the watch so that it is not unnecessarily drained. On the other hand, if the motor is temporarily stopped by acceleration, which generally lasts less than a few seconds, it is desirable that the battery continue to be connected to the motor. Therefore, a control circuit is required which disconnects the battery from the motor only if the motor is stopped more than several seconds, and which reconnects the battery to the motor when the stem is operated from its locked to its released position.

Since this circuitry must be included within the case of the watch it is desirable that it be inexpensive, take up little space and add only a small amount of weight. Moreover, the timing circuit should operate over the wide range of temperature to which a wrist watch may ordinarily be subjected.

Prior art control circuits which have timing circuits including large values of resistance and capacitance necessary to time durations on the order of several seconds are not considered to be readily adaptable to meet the above requirements. The relatively large values of resistance and capacitance required by the prior art circuits are undesirable because they tend to be costly and to take up too much space. Also such components are temperature sensitive. It is impractical to provide timing circuits requiring large values of resistance and capacitance in integrated circuit form because it is difficult to integrate the required values with the required tolerances.

SUMMARY OF THE INVENTION

It is an object of this invention to provide a digital control circuit which is inexpensive, compact, light weight and easy to manufacture for providing a desired control signal when the time duration between monitored signals exceeds a predetermined amount.

Another object of this invention is to provide a compact solid-state control circuit including a timing circuit which is relatively insensitive to temperature variations as compared to prior art timing circuits utilizing resistor-capacitor time constants.

A further object of this invention is to provide a reliable circuit for timing durations on the order of several seconds and which can be provided in integrated circuit form.

A still further object of this invention is to provide a control circuit which is suitable for connecting and disconnecting power flowing from the battery to the signal source of an electric wrist watch.

In brief, the control circuit is adapted for selectively applying and removing electrical power flowing from a power supply to the power terminal of a signal source, which provides a plurality of driving signals at a constant frequency at its output. A load, which may be a small electric motor, provides a plurality of first control signals at its output. The control circuit removes the power from the power terminal of the signal source in response to the duration between successive first control signals exceeding a predetermined time. Once the power is removed from the signal source, it ceases to provide driving signals to the load which ceases to provide the first control signals. The control circuit includes a counter having toggle, output and reset terminals. The toggle terminal is connected to the output of the signal source and the reset terminal is connected to the output of the load. The counter means counts each of the driving signals and provides a second control signal at its output in response to the occurrence of a predetermined number of the driving signals which takes substantially the predetermined time. The counter means resets its count in response to each of the first control signals. The output terminal of the counter is connected to the control terminal of a switch having a first terminal connected to the power supply and a second terminal connected to the power terminal of the signal source. This switch is responsive to the second control signal generated by the counter to disconnect the signal source from the power supply and thereby remove the driving signal from the input terminal of the counter and from the load.

DETAILED DESCRIPTION

Figure 1:
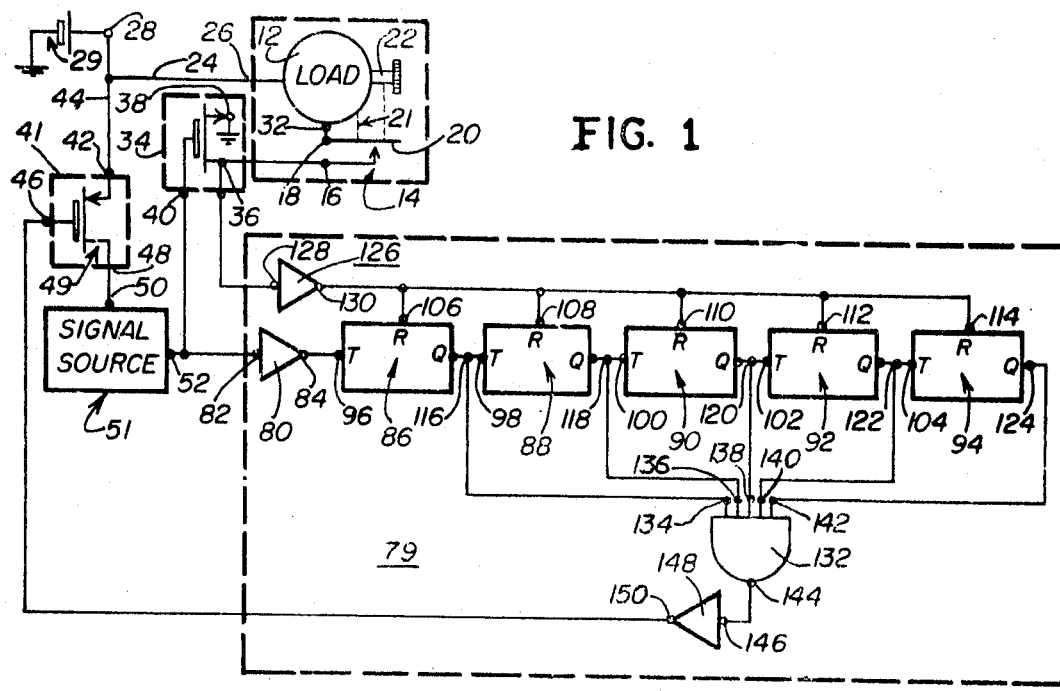
FIG. 1 is a partial block and partial schematic diagram of the circuitry for an electric wrist watch including the power control circuit of one embodiment of the invention.

In FIG. 1 a partial block and schematic diagram of a digital power control or switching circuit of one embodiment of the invention is shown. Load 12 is an electrical device which opens and closes switch 14 and which requires narrow current pulses for its operation. Switch 14 includes first terminal 16 and second terminal 18 which is connected to movable contact arm 20. In one application, load 12 is a small motor of known design which is used to move the hands of a watch in response to current pulses. Switch 14 is mechanically connected to the balance wheel of the motor as designated by dashed line 21, such that the contacts thereof are opened and closed each time the balance wheel of the motor swings through a cycle. Stem or locking device 22 operates a brake which is mechanically coupled to the balance wheel of motor 12. Movement of the balance wheel is stopped in a known manner by operating stem 22 to its locked condition. The stem 22 is also connected to and locks switch 14 in an open position. Operating the stem to its released condition frees the balance wheel and causes at least one closure of switch 14.

Conductor 24 connects terminal 26 of load 12 to terminal 28 of a direct current (DC) power supply or battery 29. Second terminal 32 of load 12 is connected to a ground or reference potential by switch 14 and semiconductor switch 34. Switch 34 includes: a first terminal 36 which is connected to terminal 16 of switch 14, a second terminal 38 which is connected to ground or reference potential and a control terminal 40. Therefore, switches 14 and 34 are connected in series between terminal 32 of load 12 and the ground or reference potential. Both of these switches must be closed for load 12 to receive driving current. Switch 34 may be comprised of a N-channel, enhancement mode, metal oxide semiconductor (MOS) FET having drain, source and gate electrodes which are respectively connected to terminals 36, 38 and 40 of switch 34. The semiconductor device is normally off or nonconductive and requires a positive potential between its gate and source for it to be switched on or rendered conductive.

Signal source 51 is selectively energized by the battery 29 by action of switch 41. Switch 41 includes: first terminal 42, which is connected through conductor 44 to power supply terminal 28, control terminal 46 and a second terminal 48, which is connected to the power or energizing terminal 50 of signal source or generator 51. Switch 41 may be comprised of a P-channel, enhancement mode MOS FET 49 having source, gate and drain electrodes which are respectively connected to terminals 42, 46 and 48. Device 49 is normally off and requires a negative voltage between its gate and source for it to be rendered conductive.

Signal source 51 develops periodic output pulses or driving signals which have a constant repetition rate or frequency e.g., on the order of from 1 to 10 hertz, at output terminal 52 in response to DC power being applied to terminal 50 by switch 41 being closed or conductive. Signal source 51 may include a crystal oscillator providing a signal having a repetition rate which is stepped down through a series of cascaded flip-flops or bistable multivibrators connected between the output terminal of the oscillator and output terminal 52 of signal source 51 in a known manner.

The application of the driving signals to load or motor 12 will now be explained. During operation of motor 12, the balance wheel thereof opens and closes the contacts of switch 14. Referring to waveform 60 in line A of FIG. 2, at time $T_0$ the contacts of switch 14 are open, at time $T_1$ the contacts are closed and at time $T_3$ the contacts are open again. As previously mentioned, signal source 51 generates periodic driving signals which may be in the form of rectangular wave 61 in line B of FIG. 2 having a constant repetition rate or frequency which, for purposes of illustration, may be assumed to be on the order of from 1 to 10 Hz. At time $T_2$, waveform 61 rises in a positive direction and remains positive, until time $T_4$ when it drops to a negative value to form pulse 62 where it remains until time $T_6$. Waveform 61 again rises to a positive value at time $T_6$ to form pulse 64.

Since switch 34 is rendered conductive in response to positive potentials applied between its control and second terminals, switch 34 is conductive from time $T_2$ to time $T_4$. Furthermore, switch 14 is closed from time $T_2$ to time $T_3$. Since both switches 14 and 34 are closed, current flows from battery 29 through load 12 to the reference potential between times $T_2$ and $T_3$ as represented by pulse 66 in line C of FIG. 2. Motor 12 responds to pulse 66 to operate through another cycle which, because of the inherent mechanical resonance of the motor, provides a closure of switch 14 at time $T_5$ as represented by waveforms 68 in line A of FIG. 2. Since positive going pulse 70 of waveform 61 in line B of FIG. 2 occurs at time $T_6$, another current pulse 72 (line C) is conducted through switches 14 and 34 to drive the motor through another cycle. The foregoing sequence continues as long as power is applied through switch 41 to signal source 51, and load 12 alternately opens and closes the contacts of switch 14 in a proper timed relation with the positive portions of waveform 61.

It is desired to electronically turn off the power to terminal 50 of signal source 51 by opening switch 41 or rendering the same non-conductive if motor 12 fails to cause closures of switch 14 for a predetermined time period, as, for instance, when stem 22 has been operated to its locking condition. It is important that power not be removed from signal source 51 if the switch 14 fails to close for any period of time less than the predetermined duration, which may be caused, for instance, by acceleration of the motor which temporarily stops the movement of the balance wheel. This acceleration may be due to a rapid movement of the wrist of a person wearing the watch. Accordingly, one purpose of the circuit of FIG. 1 is to time the duration between closures of switch 14 and if this duration exceeds a predetermined time duration to turn off switch 41 which removes power from signal generator 51.

Another purpose of the circuit is to turn on signal source or generator 51 if there is a closure of switch 14 which indicates that the stem has been moved to its free position.

Switch 41 which completes the energization circuit to signal source 51 is controlled by timing or counter circuit 79. This circuit includes invertor 80 having an input 82 connected to output 52 of signal source 51 and an output terminal 84. A plurality of flip-flops or bistable multivibrators 86 through 94 form the counting circuit. Each of these flip-flops include toggle terminals which are designated by reference numbers 96 through 104, reset terminals designated by references numbers 106 through 114 and output or Q terminals which are designated by reference numbers 116 through 124. Each flip-flop is designated to change the polarity of the signal at its output in response to a positive going signal at its toggle terminal. Toggle terminal 96 is connected to output terminal 84 of invertor 80. Moreover, a low level signal at the reset terminal reset at Q output of the associated flip-flop to a low level.

Invertor 126, has an input terminal 128 connected to terminal 16 of switch 14 and to terminal 36 of switch 34. Output terminal 130 of invertor 126 is connected to clear or reset terminals 106 through 114 of respective flip-flops 86 through 94. Thus a high level control signal applied to input 128 results in a low level signal at output 130 which resets the Q outputs of flip-flops 86 through 94.

Timing circuit 79 also includes a NAND gate 132 which has input terminals 134 through 142 which are respectively connected to Q output terminals 116 through 124 of flip-flops 86 through 94. The Q output terminals are also respectively connected to toggle terminals 98 through 104. Output terminal 144 of NAND gate 132 is connected to input terminal 146 of invertor 148. Output terminal 150 of invertor 146 is connected to control terminal 46 of switch 41. NAND gate 132 provides a high level control signal unless the signals at all of its inputs simultaneously reach a high level, in which case the NAND gate provides a low level output. Invertor 148 inverts the output level or control signal of NAND gate 132 and applies it to control terminal 46 of switch 41.

Figure 2:
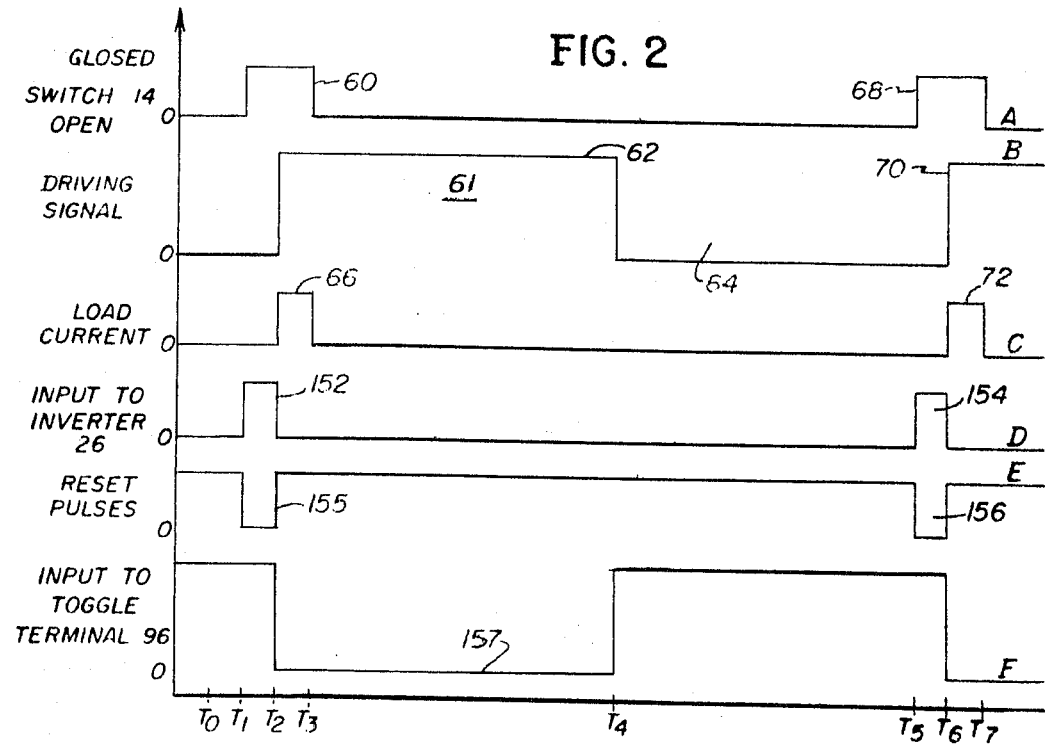
FIG. 2 is a timing diagram showing waveforms useful in understanding the operation of the circuitry of FIG. 1.

In operation, as long as switch 14 is closed by load 12 during a period of time when switch 34 is open, e.g., between times $T_1$ and $T_2$ or $T_5$ and $T_6$, pulses shown by recurring first control signals or waveforms 152 and 154 of line D of FIG. 2 are developed at input 128 of invertor 126. These pulses appear at output 130 of invertor 126 as negative pulses 155 and 156 of line E of FIG. 2 which reset the outputs of flip-flops 86 through 94 to a low level so that NAND gate 132 does not generate a shut down or second control signal.

Driving signal 61 of line B of FIG. 2, is inverted by invertor 80 to form signal 157, of line F of FIG. 2 which is applied to toggle input 96 of flip-flop 86. However, if switch 14 is closed a reset pulse such as shown in line E of FIG. 2 resets the counter before the outputs of flip-flops 86 through 94 can trigger the NAND gate. But if switch 14 is held open, flip-flop 86 produces a positive excursion at its output 116 in response to every two positive excursions of inverted driving signal 157. Two of these excursions at output 116 toggles the output of flip-flop 88. After four positive excursion of inverted driving signal 157, the output of flip-flop 88 toggles the output of flip-flop 90, ect. Thus, after 32 positive excursions of inverted driving signal 157 of line F of FIG. 2, the signal levels at each of Q outputs 116 through 124 of flip-flops 96 through 104 are all simultaneously set to high levels. This causes the output of NAND gate 132 to change to a low level which, after being inverted to a high level by invertor 148, turns off switch 41 and shuts down the power to signal sources 51.

Assuming that complementary MOS structures are used in the circuits of FIG. 1 virtually no power is drawn by the invertors, flip-flops and the gates, even though bus lines therefor are still connected to DC supply terminals 28, when the power to signal source 51 is turned off. Thus, the power shut down circuit of FIG. 1 turns off the power to signal source 51 if switch 14 is held open in excess of a predetermined period of time to keep battery 29 from being drained unnecessarily. Alternatively, if the contacts are held open for any time, less than the predetermined period of time although the inverted output signal of signal source 51 causes at least flip-flop 86 of the counter to toggle, all the Q outputs of the flip-flops will not have time to count or toggle to the high state which causes NAND gate 132 to generate the turn off control signal for switch 41. Since the timing operation depends on the frequency of driving signal 61, it is substantially independent of temperature change. Also, the circuit can be readily provided in integrated circuit form.

The start-up operation of the power control circuit will now be explained. As mentioned previously, stem 22 is coupled with switch 14 such that when stem 22 is operated to its released condition at least one contact closure of switch 14 is guaranteed. Since signal source 51 is not generating an output signal at the time of this closure, switch 34 is necessarily off. Therefore, a high signal level or control signal is applied to input 128 of invertor 126 which applies a low level signal to reset terminals 106 through 114 of the flip-flops 86 through 94. In response to the reset signal, the Q outputs of all the flip-flops are forced to a low level and the output levels of NAND gate 132 and invertor 148 change to remove the turn-off control signal from switch 41 which then applies power to signal source 51. As a result a driving signal is developed at output terminal 52 which renders switch 34 conductive while switch 14 is closed, thereby energizing the load 12.

What has been described, therefore, is a digital power control circuit for providing a desired output or control signal when the time duration between monitored signals exceeds a predetermined amount. The circuit is inexpensive, compact, lightweight and easy to manufacture. It is also relatively insensitive to temperature variations as compared to prior art timing circuits utilizing resistor-capacitor time constants. The structure of the active components can be fabricated in a single integrated circuit using CMOS technology. Although the timing circuit is suitable for connecting and disconnecting power to the signal source of an electric wrist watch, other applications of this invention are believed to be apparent to one skilled in the art.

We claim:

1. A control circuit adapted for selectively applying and removing electrical power flowing from a power supply to the power terminal of a signal source which when energized provides a plurality of driving signals at a constant frequency at its output terminal to drive a load that selectively provides first control signals at its output terminal, the control circuit removing the power from the power terminal of the signal source in response to the duration between successive ones of the first control signals exceeding a predetermined time, the control circuit including in combination:

counter means having an input terminal, an output terminal and a reset terminal;

first circuit means coupling said input terminal to the output terminal of the signal source;

second circuit means coupling said reset terminal to the output terminal of the load;

said counter means counting the driving signals and providing a second control signal at said output terminal thereof in response to the occurrence of a predetermined number of said driving signals which takes substantially the predetermined time, said counter means resetting its count in response to each of the first control signals;

switch means for connecting the power supply to the signal source and having a control terminal;

third circuit means connecting said control terminal of said switch means to said output terminal of said counter means; and said switch means being responsive to said second control signal applied to said control terminal thereof to disconnect the signal source from the power supply thereby causing the termination of the driving signal.

2. The control circuit of claim 1 wherein said counter means is adapted to provide a third control signal to said control terminal of said switch means in response to any one of said first control signals occurring after said second control signal, said third control signal rendering said switch means conductive to apply power to the signal source in response to said first control signal.

3. The control circuit of claim 1 wherein said counter means includes:
multivibrator means having toggle, reset and output terminals;
gate means having input and output terminals, said input terminal of said gate means being connected to said output terminal of said multivibrator means; and
fourth circuit means connecting said output terminal of said gate means to said output terminal of said counter means.

4. The control circuit of claim 3 wherein said first, second and fourth circuit means each includes an invertor.

5. The control circuit of claim 3 wherein said multivibrator includes a plurality of bistable multivibrators each having toggle, reset and output terminals;
fifth circuit means coupling all of said reset terminals together to form said counter reset terminal;
said gate means having a plurality of input terminals; and
means connecting said output terminals of said bistable multivibrator means to said inputs of said gate means.

6. The control circuit of claim 3 wherein said switch means, said multivibrator means and said gate means are complementary metal oxide semiconductor structures forming parts of an integrated circuit.

7. A control circuit adapted for selectively switching electrical power flowing from a battery to the power terminal of an oscillator providing driving pulses at a constant frequency at its output terminal when power is applied thereto, which pulses drive a watch motor that provides a plurality of first control signals at its output terminal when being driven by the driving pulses so long as a mechanical device connected with the watch motor has not been operated, the control circuit including in combination:
counter means having a plurality of bistable multivibrators each having reset, toggle and output terminals, first circuit means connecting said reset terminals together to form a counter reset terminal, said toggle terminal of a first multivibrator comprising a toggle terminal of the counter, and the output terminals of all except a last multivibrator being coupled to the input terminal of an adjacent multivibrator, the output terminal of said last multivibrator being a counter output terminal,
second circuit means coupling said counter toggle terminal to the output terminal of the oscillator, said counter means counting the driving signals and providing a second control signal at said counter output terminal in response to the occurrence of a predetermined number of said driving signals; said predetermined number of driving signals occurring if said mechanical device is operated;
third circuit means coupling said counter reset terminal to the output terminal of the motor;
said counter means resetting its count in response to each first control signal developed by the motor;
gate means having a plurality of input terminals and an output terminal, each of said gate input terminals being connected to one of said output terminals of one of said plurality of bistable multivibrator means, said gate means being structured to provide a third control signal at said output terminal thereof in response to said second control signal;
switch means having a first terminal connected to the battery, a second terminal connected to the power terminal of the oscillator, and a control terminal;
fourth circuit means connecting said control terminal of said switch means to said output terminal of said gate means; and
said switch means being responsive to said third control signal to disconnect the oscillator from the battery.

8. The control circuit of claim 7 further including means connected with the motor and which is operable to cause the motor to provide one of said first control signals at its output which resets said counter means.

9. The control circuit of claim 7 wherein said second, third and fourth circuit means each include an invertor.

10. The control circuit of claim 7 where said counter, gate, and switch means are included in an integrated circuit.

11. An assembly for an electrical horological instrument including in combination:
power supply means having a limited quantity of electrical energy stored therein;
driving circuit means coupled to said power supply means;
an electric motor coupled to and operated by said driving circuit means;
motor-operated switch means which is opened and closed by said electric motor;
manually operable means adapted to control the state of said motor-operated switch means; and
control circuit means for selectively controlling the flow of electrical power from said power supply means to said electric motor, said control circuit means having electrically operated logic means coupled with said motor-operated switch means and said driving circuit means, said logic means being responsive to a state of said motor-operated switch means to selectively remove the driving voltage from said electric motor to thereby preserve said electrical energy stored in said power supply means.

12. The assembly of claim 11 wherein said control circuit means includes counter means and gate means.

13. The assembly of claim 12 wherein said counter means includes a plurality of multivibrators each having reset, input and output terminals;
first circuit means connecting said reset terminals together to provide a reset terminal for the counter means;
second circuit means coupling said reset terminal of said counter means to said motor-operated switch means; and
third circuit means connecting the output terminal of all except the last multivibrator to the input terminal of an adjacent multivibrator, the output terminal of said last multivibrator being coupled to said gate means.

14. The assembly of claim 13 wherein said driving circuit means, said counter means and said gate means are comprised of complementary metal oxide semiconductor devices that are all included in one integrated circuit structure.

* * * * *